(12) United States Patent
Fashandi et al.

(10) Patent No.: US 8,009,635 B2
(45) Date of Patent: Aug. 30, 2011

(54) REDUCING HANDOFF LATENCY IN A WIRELESS LOCAL AREA NETWORK THROUGH AN ACTIVATION ALERT THAT AFFECTS A POWER STATE OF A RECEIVING MESH ACCESS POINT

(75) Inventors: Shervan Fashandi, Hamilton (CA); Terence Douglas Todd, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 389 days.

(21) Appl. No.: 11/530,059

(22) Filed: Sep. 8, 2006

(65) Prior Publication Data

US 2007/0058588 A1 Mar. 15, 2007

Related U.S. Application Data

(60) Provisional application No. 60/715,142, filed on Sep. 9, 2005.

(51) Int. Cl.
*H04W 4/00* (2009.01)
(52) U.S. Cl. ............... 370/333; 370/331; 455/431.1; 455/571; 455/436

(58) Field of Classification Search ............ 370/338, 370/331; 455/438, 442, 436, 439, 432.1, 455/571
See application file for complete search history.

(56) References Cited

U.S. PATENT DOCUMENTS

| | | | | |
|---|---|---|---|---|
| 5,267,261 | A * | 11/1993 | Blakeney et al. | 370/332 |
| 6,351,650 | B1 * | 2/2002 | Lundby et al. | 455/522 |
| 7,068,624 | B1 * | 6/2006 | Dantu et al. | 370/331 |
| 7,454,634 | B1 * | 11/2008 | Donovan et al. | 713/322 |
| 2002/0194384 | A1 * | 12/2002 | Habetha | 709/249 |
| 2005/0058151 | A1 * | 3/2005 | Yeh | 370/445 |
| 2005/0058157 | A1 * | 3/2005 | Pikula et al. | 370/503 |

* cited by examiner

*Primary Examiner* — Jinsong Hu
*Assistant Examiner* — Quan Hua
(74) *Attorney, Agent, or Firm* — Integral Intellectual Property Inc.; Miriam Paton

(57) ABSTRACT

If a handoff by a mobile station currently associated with a particular access point is probable, then the particular access point sends an activation alert to one or more other access points. An access point receiving the activation alert that is in a low-power state enters a higher-power state. An access point receiving the activation alert that is in a higher-power state, remains in that higher-power state.

17 Claims, 17 Drawing Sheets

REDUCING HANDOFF LATENCY IN A WIRELESS LOCAL AREA NETWORK THROUGH AN ACTIVATION ALERT THAT AFFECTS A POWER STATE OF A RECEIVING MESH ACCESS POINT

CROSS-REFERENCE TO RELATED APPLICATIONS

This application claims priority under 35 USC 119(e) from U.S. Provisional Patent Application No. 60/715,142, filed Sep. 9, 2005, and which is incorporated by reference herein.

BACKGROUND

The invention generally relates to wireless local area networks (WLAN). In particular, embodiments of the invention relate to power saving for one or more access points (AP) in a WLAN.

Typically, an AP is powered through a wired connection, for example, using inline Power over Ethernet, or by connecting the AP (possibly through a power injector and/or universal power supply) to an alternating current (AC) power outlet. This is also the case with some outdoor installations of APs. However, for other installations, it may be more suitable to use wind- and/or solar- and/or battery-powered APs.

Handoffs from one AP to another will occur as a mobile station moves through the coverage area of a WLAN. In most real-time applications, handoff is initiated once the quality for the AP-mobile station wireless link consistently drops below a vendor-specific threshold, denoted Scan_Threshold. Each handoff, which normally includes both a scanning phase and a handoff execution phase, imposes a temporary disconnection from the network, referred to as handoff latency. For real-time applications, for example, voice over Internet Protocol (VoIP), it is important to minimize this interruption as much as possible.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
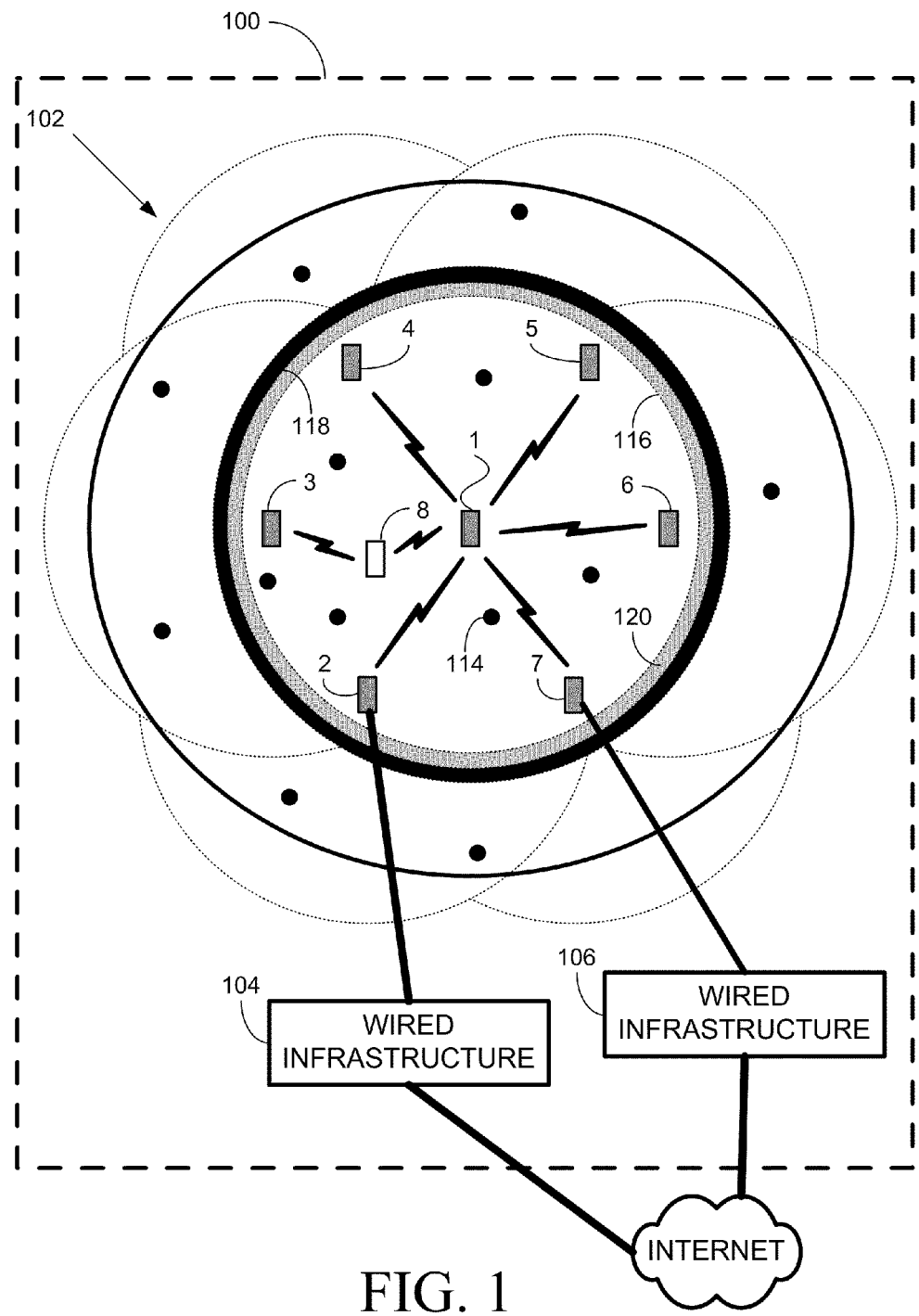
FIG. 1 is an illustration of an exemplary communications system, according to some embodiments.

As defined in the IEEE 802.11s specifications, a mesh point (MP) is any node that supports mesh services, that is, node-to-node communication with other IEEE 802.11s nodes. A mesh point that also serves as a conventional access point is referred to as a "mesh access point (MAP)". A mesh point that supports a wired connection to a local area network (LAN) is a "mesh portal". FIG. 1 is an illustration of an exemplary communications system 100, according to some embodiments. System 100 includes a mesh WLAN 102, which includes mesh access points (MAPs), for example APs 1 through 7. All references to access points in this description are to mesh access points. The use of the term "mesh point" in this description refers to a mesh point that is not a mesh access point. WLAN 102 may also include wireless mesh points, for example, a wireless mesh point 8 is used to relay communications between AP 1 and AP 3. The coverage area of each AP is indicated by a dashed circle centered at the AP. APs 2 and 7 have wired connections to the Internet via wired infrastructures 104 and 106, respectively, and are therefore mesh access points and mesh portals.

A mobile station 114 is associated with AP 1, and other mobile stations are associated with other APs. A non-exhaustive list of examples for the mobile stations includes a wireless-enabled laptop, a wireless-enabled cellphone, a wireless-enabled personal digital assistant (PDA), a wireless-enabled video camera, a wireless-enabled gaming console, a wireless Internet Protocol (IP) phone and any other suitable mobile device.

Some or all of APs 1-7 have a mechanism for reducing power consumption, although no such mechanism is currently part of the IEEE 802.11 standard. To reduce power consumption, an AP may spend as much time as possible in a low-power state. In order that this power saving does not violate the quality of service (QoS) needed to support various real-time connections, one or more of APs 1-7 may implement one or more of the following methods, thus reducing the handoff latency in the WLAN.

Figure 2:
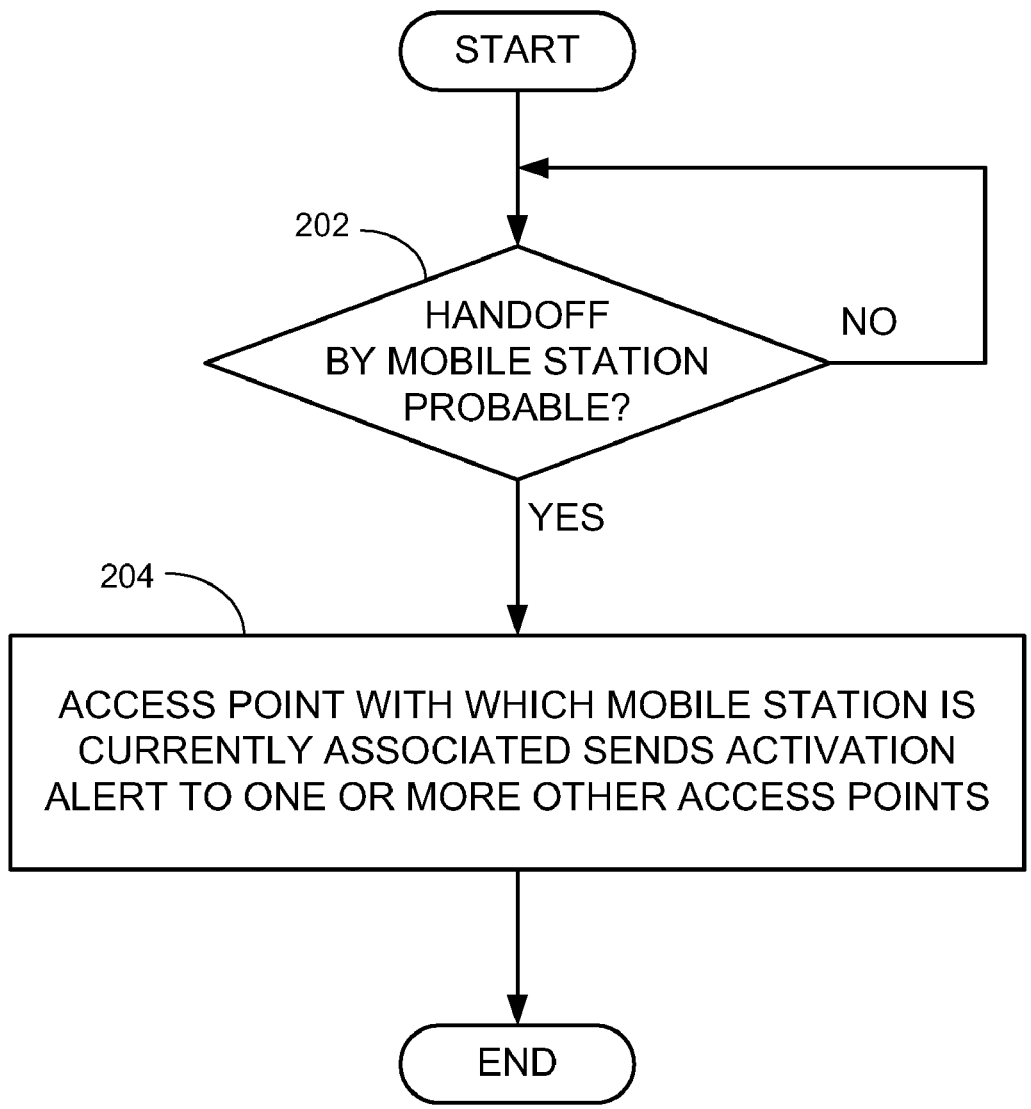
FIG. 2 is a flowchart of an exemplary method according to some embodiments.

FIG. 2 is a flowchart of an exemplary method for reducing handoff latency, according to some embodiments. At 202, an access point, for example, AP 1, with which a mobile station, for example, mobile station 114, is currently associated, determines whether it is probable that the mobile station will initiate a handoff. This determination may be triggered by a decrease in the quality of the AP-mobile station wireless link. For example, the AP may determine that a handoff is probable if the quality of the AP-mobile station wireless link drops below a predetermined threshold, denoted Activation_Threshold. In another example, the AP may determine that a handoff is probable if the quality of the AP-mobile station wireless link drops below Activation_Threshold for at least a predetermined period of time. Activation_Threshold is equal to or higher than Scan_Threshold. The quality may be a measure or a filtered measure of the receive signal strength indication (RSSI). In yet another example, the AP may determine that a handoff is probable if a frame loss rate or packet loss rate exceeds a predetermined threshold.

If a handoff by the mobile station is probable, then at 204, the AP with which the mobile station is associated sends an activation alert to one or more other access points.

The AP with which the mobile station is associated may use one or more mesh access points and/or mesh points to relay communications between itself and another access point. For example, as shown in FIG. 1, AP 2 uses AP 1 to relay communications between itself and AP 5, and AP 1 uses mesh point 8 to relay communications between itself and AP 3. If the other access point is to receive the activation alert, any mesh access points and/or mesh points in the relay path will also need to be sufficiently active in order to transmit the activation alert and any signaling related to the handoff, should it occur. The AP with which the mobile station is associated may send activation alerts to the mesh access points and/or mesh points in the relay path. Alternatively, the activation alert sent by the AP with which the mobile station is associated may affect any mesh access points and/or mesh points in the relay path in the same manner as it affects the other access point for which it is intended.

Figure 3:
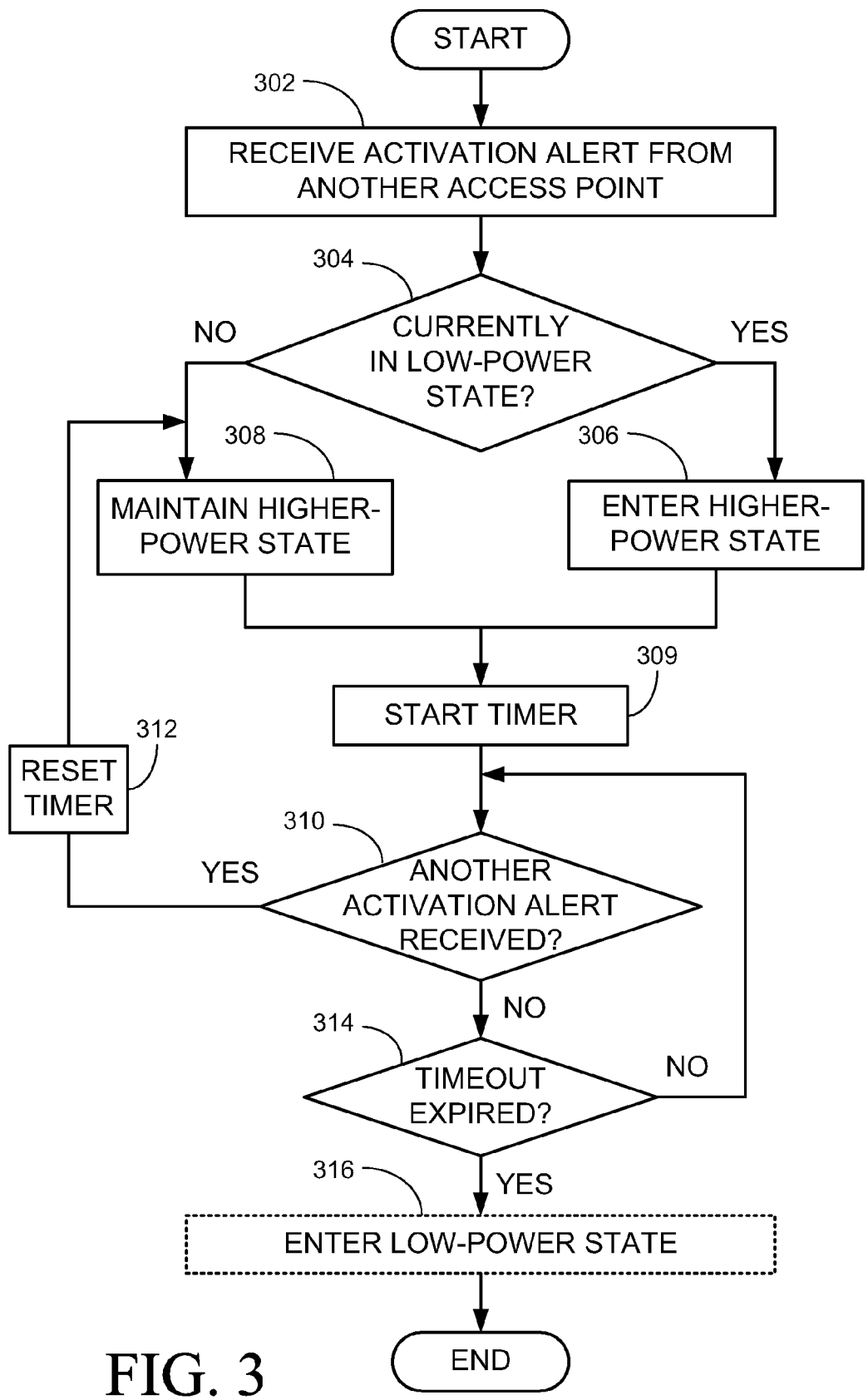
FIG. 3 is a flowchart of an exemplary method according to some embodiments.

The effect of the activation alert on a receiving AP is illustrated in FIG. 3, which is a flowchart of an exemplary method to hasten AP discovery by the mobile station, according to some embodiments.

At 302, an AP, for example, AP 6, receives the activation alert from the AP with which the mobile station is currently associated, for example, AP 1.

If the receiving AP is currently in a low-power state (checked at 304), then the receiving AP enters a higher-power state at 306, and otherwise, the receiving AP maintains the higher-power state (and refrains from entering the low-power state) at 308. The higher-power state may be one of two or more higher-power states possible, and the higher-power state to which the receiving AP transitions may be determined by the level of activity and/or power consumption that suits the latency or Quality of Service requirements. A timer for a timeout period, denoted by Activation_Time, is started at 309. For the duration of the timeout period, it is checked at 310 whether another activation alert has been received (from any AP). If so, the timer for the timeout period is reset at 312, and the method continues from 308. Otherwise, once the timeout period has expired, which is checked at 314, the receiving AP may enter the low-power state at 316. In an alternative embodiment, there is no predetermined timeout period. For example, the receiving AP may enter or maintain the higher-power state until instructed otherwise or until some other criterion is fulfilled.

The receiving AP and the AP that sent the original or previous activation alert may communicate to determine whether the receiving AP should remain in the higher-power state.

Figure 4:
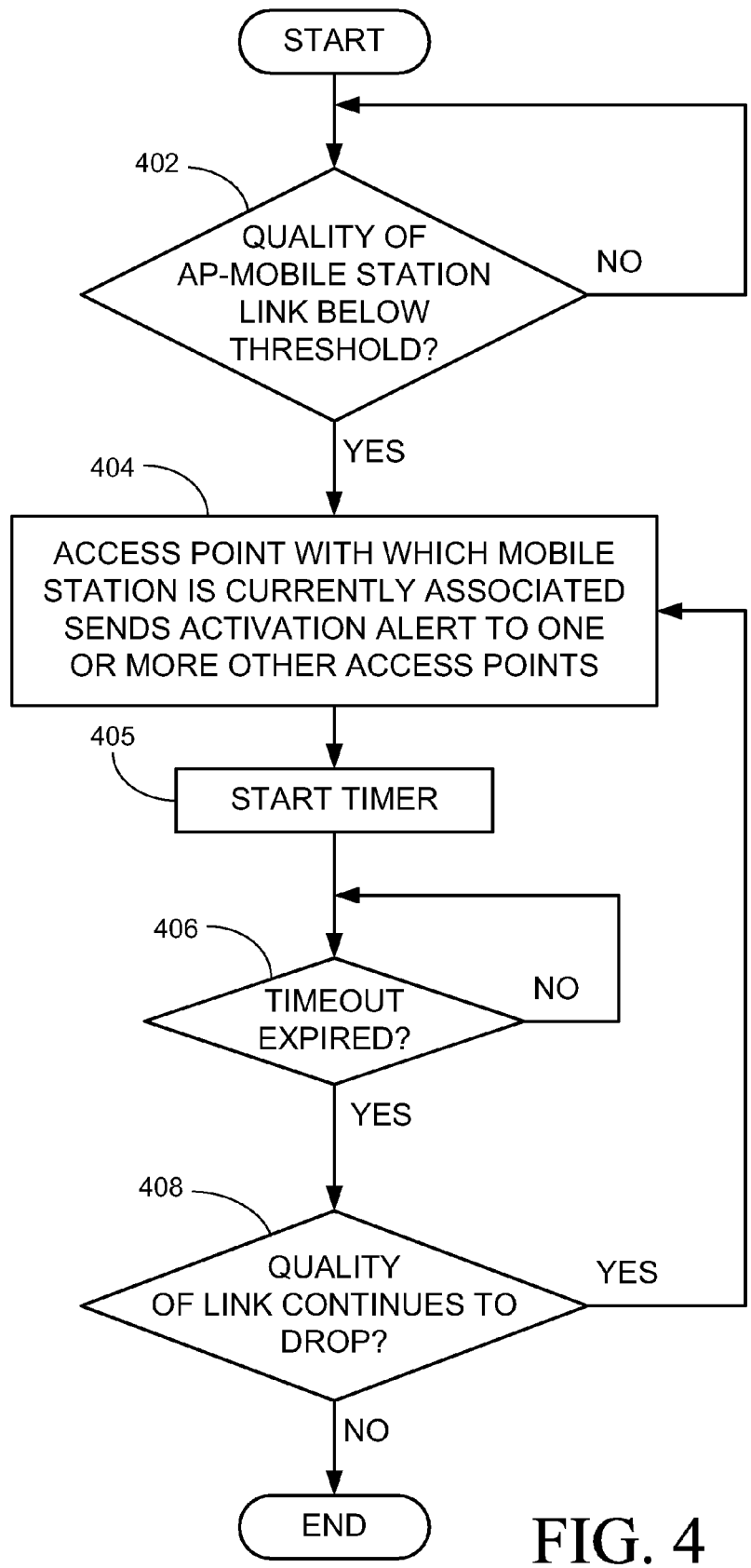
FIGS. 4-6 are flowcharts of exemplary methods based on the method of FIG. 2, according to some embodiments.

FIG. 4 is a flowchart of an exemplary variation of the method of FIG. 2. At 402, an access point, for example, AP 1, with which a mobile station, for example, mobile station 114, is currently associated, determines whether the quality of the AP-mobile station wireless link has dropped below a predetermined threshold, denoted Activation_Threshold. If so, then at 404, the AP with which the mobile station is associated sends an activation alert to one or more other access points. A timeout period of shorter duration than Activation_Time starts at 405 with the sending of the activation alert. If that timeout period has expired (checked at 406), and the quality of the link continues to drop relative to its measurement at 420 (checked at 408), then the method resumes from 404 so that another activation alert is sent. If the timeout period has expired but the quality of the link does not continue to drop, then the method ends. In an alternative embodiment, there is no predetermined timeout period. For example, the timeout period may vary according to conditions in the AP or the mobile station.

Figure 5:
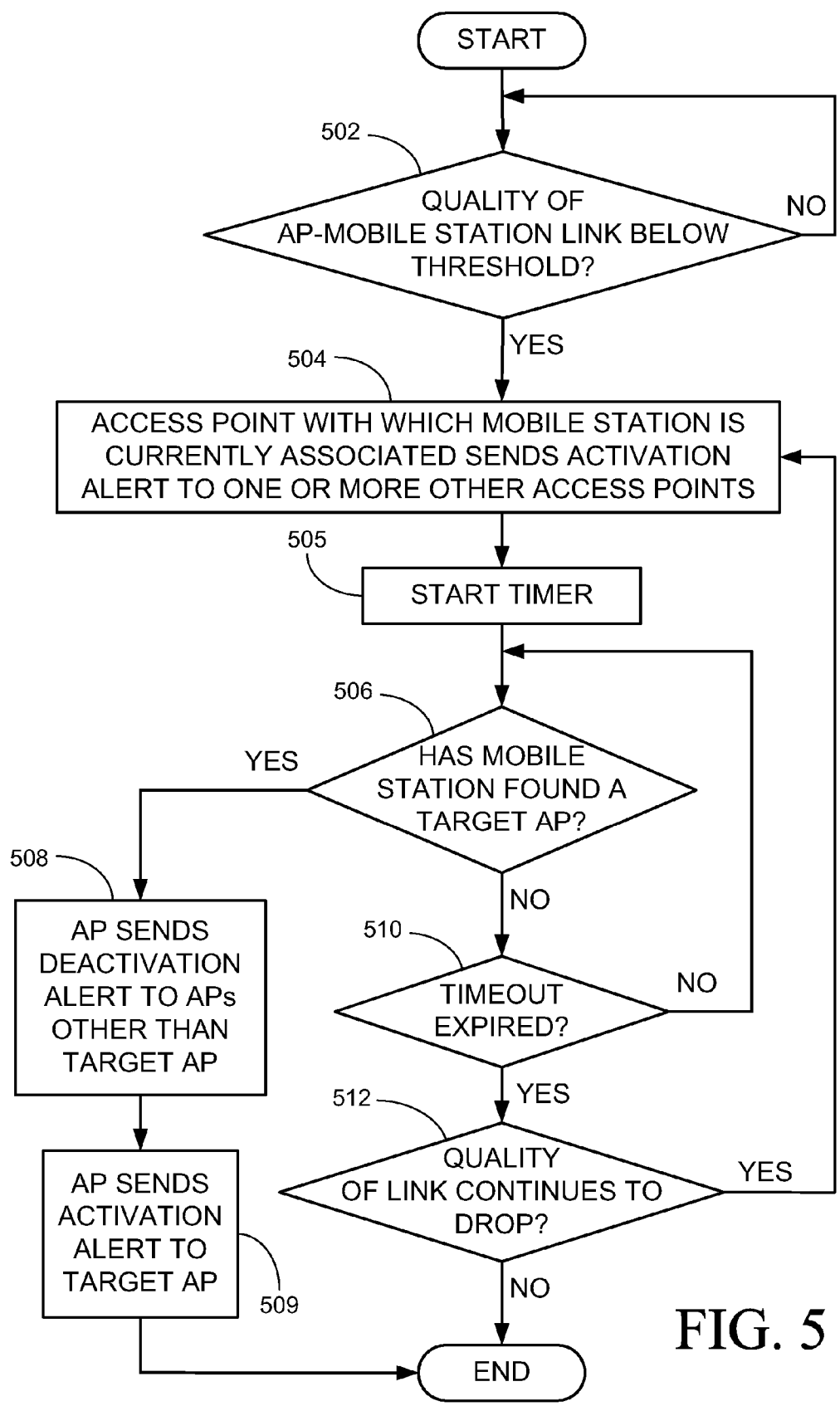

FIG. 5 is a flowchart of another exemplary variation of the method of FIG. 2. At 502, an access point, for example, AP 1, with which a mobile station, for example, mobile station 114, is currently associated, determines whether the quality of the AP-mobile station wireless link has dropped below a predetermined threshold, denoted Activation_Threshold. If so, then at 504, the AP with which the mobile station is associated sends an activation alert to one or more other access points. A timer for a timeout period of shorter duration than Activation_Time is started at 505.

If the mobile station has found a target AP (checked at 506), then at 508, the AP with which the mobile station is associated may send a deactivation alert to the one or more other access points, other than the target AP, and at 509, the AP with which the mobile station is associated may send another activation alert to the target AP. In an alternative embodiment, there is no predetermined timeout period. In some embodiments, the target AP may be the one that sends a deactivation alert at 508 to the one or more other access points, rather than the AP associated with the mobile station. In another embodiment, the activated APs may query the AP with which the mobile station is associated to determine if the activated state is required.

Scanning may be active or passive; in most cases, active scanning is normally used for real-time handoff purposes. When a channel is actively scanned, the mobile station sends a probe request packet and monitors the channel for a time period equal to MinChannelTime. If it hears any traffic, it continues listening for a time equal to MaxChannelTime. During this interval, the mobile station collects all probe responses from any available access points, otherwise it switches to the next channel after MinChannelTime expires. Once the scanning phase is completed, the mobile station selects the best access point for its handoff target. Scanning typically accounts for a significant portion of the entire handoff latency budget.

If the mobile station has not found a target AP, then the method continues to 510, where it is checked whether the timeout period that started with the sending of the activation alert has expired.

If the timeout period has expired, and the quality of the link continues to drop relative to its measurement at 502 (checked at 512), then the method resumes from 504 so that another activation alert is sent. If the timeout period has expired but the quality of the link does not continue to drop, then the method ends.

Figure 6:
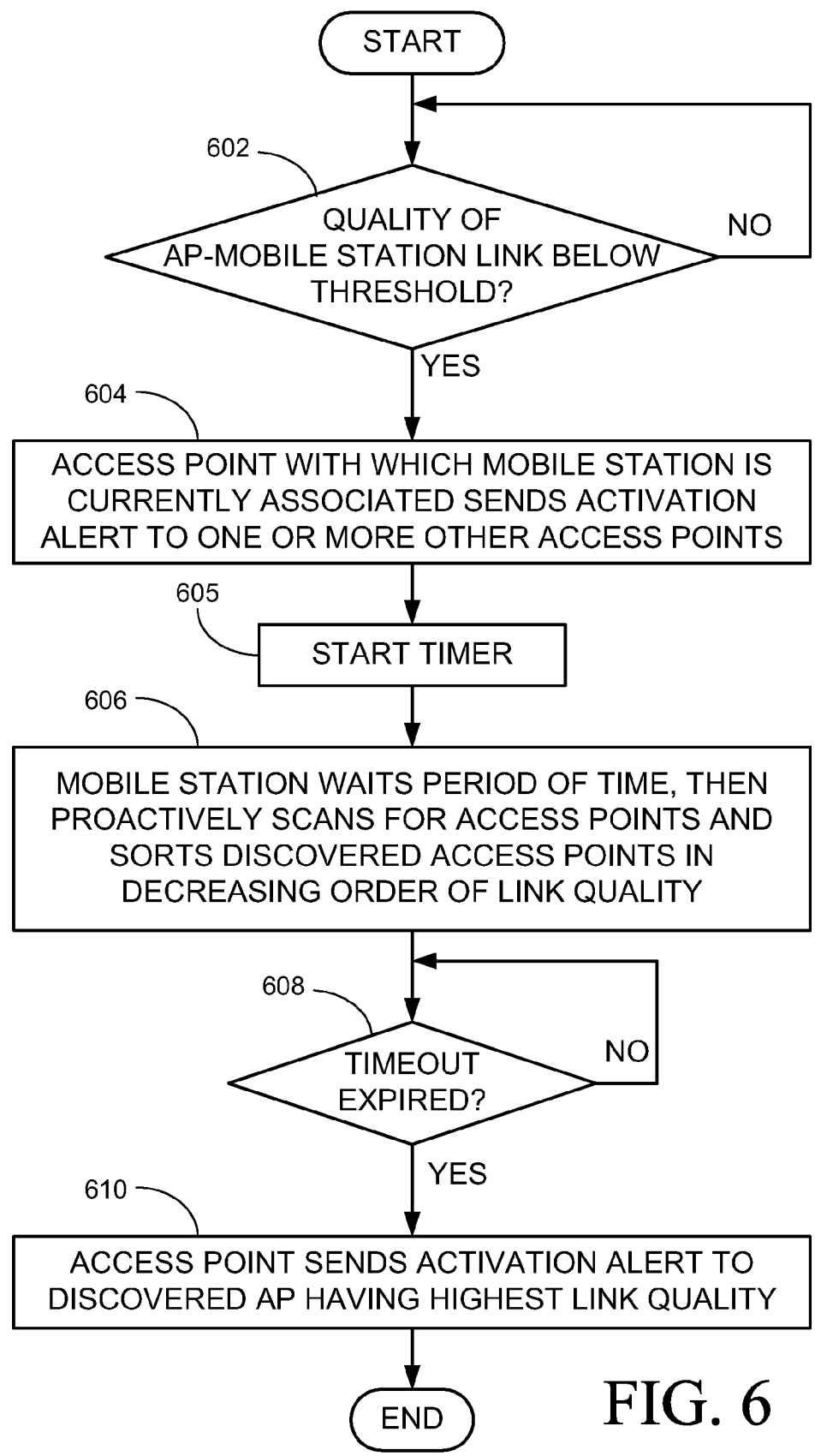

FIG. 6 is a flowchart of yet another exemplary variation of the method of FIG. 2. At 602, an access point, for example, AP 1, with which a mobile station, for example, mobile station 114, is currently associated, determines whether the quality of the AP-mobile station wireless link has dropped below a predetermined threshold, denoted Activation_Threshold for at least a predetermined period of time. If so, then at 604, the AP with which the mobile station is associated sends an activation alert to one or more other access points. A timer for a timeout period of shorter duration than Activation_Time is started at 605.

At 606, after a period of time that may be predetermined, the mobile station proactively scans for APs (even though the quality of the link has not necessarily dropped below Scan_Threshold), sorts discovered APs in decreasing order of quality of the AP-mobile station link, and sends an indication of the discovered AP having the highest measured link quality to the AP with which the mobile station is associated.

If the timeout period Activation_Time has expired (checked at 608), and the quality of the link continues to drop, then at 610 the AP with which the mobile station is associated sends another activation alert to the discovered AP having the highest measured link quality.

At 204 of FIG. 2, at 404 of FIG. 4, at 504 of FIG. 5 and at 604 of FIG. 6, the AP with which the mobile station is associated sends an activation alert to one or more other access points. In one embodiment, the activation alert is broadcast and received by all access points in the WLAN that can hear it. In another embodiment, the activation alert is multicast to one or more selected access points in the WLAN. In yet another embodiment, the activation alert is sent one-by-one to the one or more selected access points in the WLAN via unicast transmissions. For example, the selected access points may comprise the access points of the neighbor graph of the AP sending the activation alert. Neighbor graphs are described in Minho Shin, Arunesh Mishra and William A. Arbaugh, "Improving the latency of 802.11 hand-offs using neighbor graphs", *MobiSYS '04: Proceedings of the 2$^{nd}$ international conference on Mobile systems, applications, and services,* pages 70-83, 2004.

Figure 7:
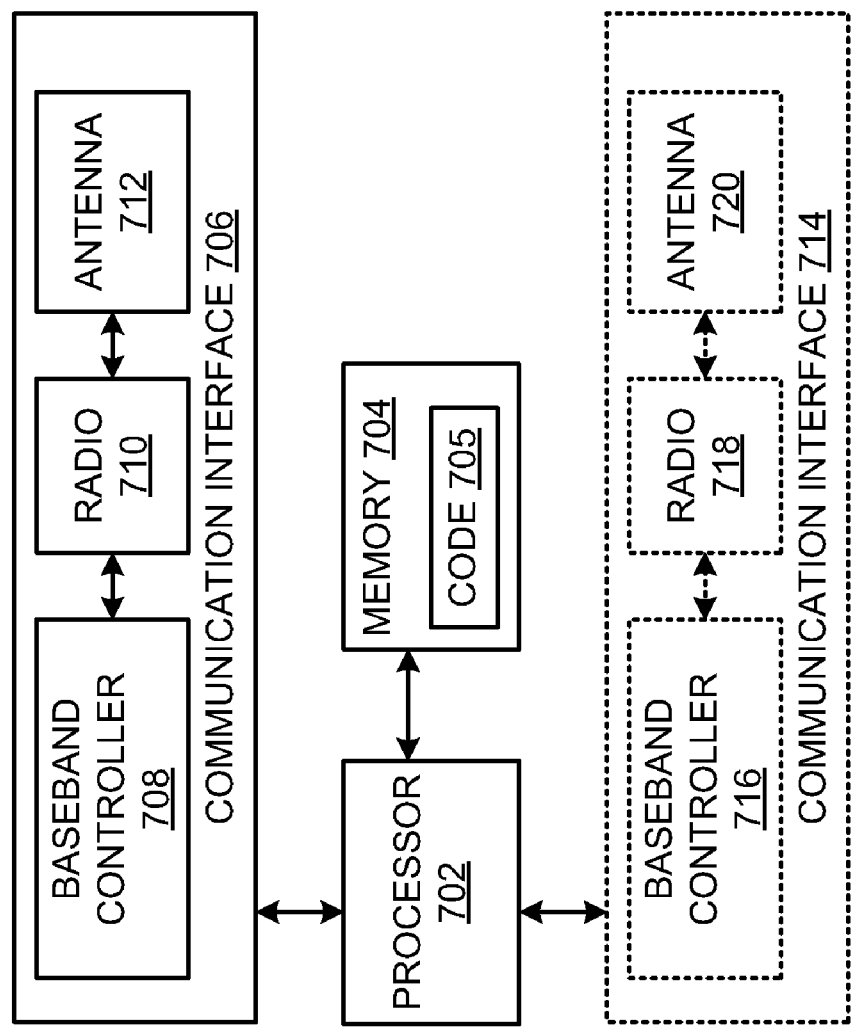
FIG. 7 is a block diagram of an exemplary access point, according to some embodiments.
Figure 7:
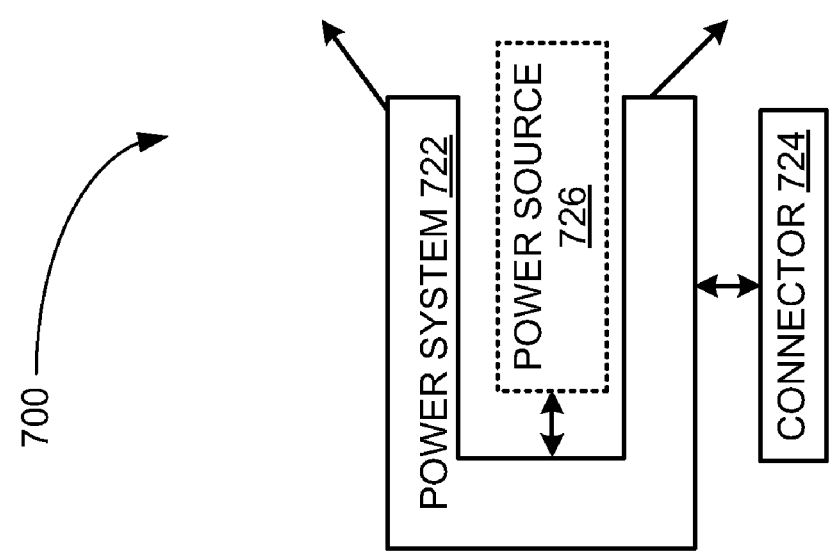

FIG. 7 is a simplified block diagram of exemplary access point 700, according to some embodiments. AP 700 includes a processor 702 and a memory 704 coupled to processor 702. Memory 704 includes code 705 that, when executed by processor 702, may implement the methods described herein.

AP 700 includes a wireless communication interface 706, compatible with one or more standards of the family of IEEE 802.11 wireless communication standards. Since AP 700 is a mesh access point, it is compatible with a mesh networking standard. Wireless communication interface 706 is coupled to processor 702 and includes at least a baseband controller 708, a radio 710, and an antenna 712. AP 700 may optionally include an additional wireless communication interface 714, compatible with one or more standards of the family of IEEE 802.11 wireless communication standards. Wireless communication interface 714 is coupled to processor 702 and includes at least a baseband controller 716, a radio 718, and an antenna 720.

By way of wireless communication interface 706 and/or wireless communication interface 714, AP 700 may be able to establish communication sessions with other devices, such as mobile stations and other access points.

AP 700 includes a power system 722 and a connector 724 coupled to power system 722. AP 700 may optionally include a power source 726 coupled to power system 722. Connector 724 is connectable to an external power source (not shown) to provide power for charging power source 726 and/or for operating AP 700. Power system 722 provides electrical coupling between the external power source and power source 726, and provides electrical coupling between power source 726 and the electrical components of AP 700 (e.g. processor 702, memory 704, and the like). As part of the electrical coupling between the external power source and power source 726, power system 722 may control the charging of power source 726 with electrical charge drawn from the external power source.

A non-exhaustive list of examples for power source 726 includes one or more Ni—Cd (Nickel Cadmium) batteries, one or more Ni-MH (Nickel-Metal Hydride) batteries, one or more Lithium Ion batteries, one or more rechargeable Alkaline batteries, one or more capacitors, one or more supercapacitors, and any other suitable power source. A non-exhaustive list of examples for an external power source includes an AC power source, a DC power source, wind-power-conversion power source, solar-power-conversion power source.

Processor 702, memory 704, one or more of baseband controllers 708 and 716, and one or more of radios 710 and 718 are examples of circuitry that can be controlled to be in low-power states.

Simulation Model

Simulations of various topologies of wireless access points and various usage scenarios were performed to study the handoff process.

The "duty cycle" is defined as the average fraction of time an AP stays in a fully awake state, when no activation occurs. The "actual duty cycle" is defined as the actual fraction of time that the AP stays in a fully awake state, when activations resulting from receipt of activation alerts and/or deactivation alerts are taken into account.

For the purposes of the simulation, an exponential path loss radio propagation model was assumed, as expressed by $$P_{RECEIVE}(r) = k \cdot P_{TRANSMIT}/r^{\alpha}, \quad (1)$$

where $P_{RECEIVE}$ is the receive power, $P_{TRANSMIT}$ is the transmit power, r is the distance between the mobile station and the AP, k is a constant and $\alpha$ is the path loss exponent, having a value of 3.5, for example.

With this assumption, the quality of the AP—mobile station link for AP 1 of FIG. 1 will reach Activation_Threshold at a circle 116 centered at AP 1, and will reach Scan_Threshold at a larger circle 118 centered at AP 1.

Three proposed activation schemes were evaluated. In the "Neighbor Activation with Timeout (NAT)" scheme, the AP with which the mobile station is associated implements the method of FIG. 4, with the activation alert sent to its neighboring APs, and the neighboring APs implement the method of FIG. 3. In the "Neighbor Activation with Notification (NAN)" scheme, the AP associated with the mobile station implements the method of FIG. 5, with the activation alert sent to its neighboring APs, and the neighboring APs implement the method of FIG. 3. In the "Proactive Activation (PA)" scheme, the AP with which the mobile station is associated implements the method of FIG. 6, with the activation alert sent to its neighboring APs, and the neighboring APs implement the method of FIG. 3.

In the NAN scheme, as long as a mobile station is located in an Activation Ring 120 between circle 116 and circle 118, all neighboring APs will remain awake provided the quality of the link is still decreasing. Assuming that all mobile stations are moving, the probability that an AP can go into a low-power state is equal to the probability that there is no mobile station in the Activation Ring of any of its neighbors.

First the case of only mobile station in the entire network coverage area is analyzed, and then the analysis is extended to the general case. $f_{XY}(x,y,j)$ is defined as the probability that the mobile station is located at the point (x,y) and is associated with AP j:

$$f_{XY}(x, y, j)dx\,dy = Pr(x < X < x+dx, y < Y < y+dy, AP\ j). \quad (2)$$

where X and Y are random variables.

For simplicity, mobile stations are assumed to be distributed over the entire coverage area uniformly. It is also assumed that if a mobile station at point (x,y) is in the range of k APs, it is equally likely for it to be associated with any of them. Therefore, $f_{XY}(x,y,j)$ can be expressed as follows:

$$f_{XY}(x, y, j) = \begin{cases} \frac{1}{k(x,y)A}, \\ 0, \end{cases} \quad (3)$$

if AP j is one of the k(x,y) APs in range otherwise where k(x,y) is the number of APs in range of point (x,y) and A is the coverage area of the network. With this expression for $f_{XY}(x,y,j)$, the probability that a mobile station exists in the Activation Ring of the neighbors of AP i is as follows:

$$P_1(AP\ i\ \text{stays awake}) = P_1(Q_i\ \text{not empty}) \quad (4)$$
$$= \sum_{j \in \{all\ neighbors\}} \iint_{S_j} f_{XY}(x, y, j)dx\,dy$$

where $S_j$ is the Activation Ring of AP j and $Q_i$ is the union of Activation Rings of the neighbors of AP i.

For the general case of N mobile stations, since the position of the mobile stations is independent of each other, one can argue that the following equation holds:

$$P_N(AP\ i\ \text{stays awake}) = P_N(Q_i\ \text{not empty}) = 1-(1-P_1(Q_i\ \text{not empty}))^N. \quad (5)$$

The actual duty cycle $DT_{ACTUAL}$ may therefore be expressed as follows:

$$DT_{ACTUAL} = (1-DT_{NOMINAL})P_N(AP\ i\ \text{stays awake}) + DT_{NOMINAL}. \quad (6)$$

The consumed power is directly related to the duty cycles. The AP is awake for a fraction $DT_{ACTUAL}$ of time on its coverage channel and for $DT_{NOMINAL}$ on its relay channel. Assuming power consumption in receive and listen modes are equal and neglecting the extra power consumption due to Carrier Sense Multiple Access/Collision Avoidance (CSMA/CA) contention and retransmission, the average power consumption $P_{AVG}$ of each AP will be approximately as follows:

$$P_{AVG} \approx (DT_{ACTUAL} + DT_{NOMINAL})P_{LISTEN} + \frac{\lambda_{AVG}(P_{TRANSMIT} - P_{RECIEVE})}{R}, \quad (7)$$

where $\lambda_{AVG}$ is the average downlink and uplink bit arrival rate of each AP, and R is the channel bit rate. In this model, it is assumed that the power consumed in the low-power state is small by comparison. The integrals in Equation 4 above depend on the specific topology, and it may not be easy to find a closed general form. Therefore, they were computed numerically by filling the network coverage area with tiny squares, approximated as differential area elements, dx dy. Results of this theoretical analysis appear hereinbelow in the section entitled "Simulation Results".

The theoretical analysis of the NAT scheme is more complicated than NAN. AP i can go into a low-power state only if the Activation Rings of all of its neighbors ($Q_i$) have been empty for at least Activation_Time. However, intuitively, the actual duty cycle and the average power consumption of the NAT scheme are slightly more than those of the NAN scheme.

In the case of the PA scheme, AP i should stay awake if there is a mobile station in the $Q_i$ region whose closest AP is AP i. Therefore, $P_1$(AP i stays awake) for the PA scheme may be expressed as follows:

$$P_1(AP\ i\ \text{stays awake}) = P_1(Q_i\ \text{not empty}) \quad (8)$$
$$= \sum_{j \in \{all\ neighbors\}} \iint_{S_j} g(x, y, i)f_{XY}(x, y, j)dx\,dy,$$

where g(x,y,i) is defined over the network coverage area as follows:

$$g(x, y, i) = \begin{cases} 1, & \text{if } AP\ i\ \text{is the closest } AP\ \text{to point}(x, y) \\ 0, & \text{otherwise.} \end{cases} \quad (9)$$

The rest of the actual duty cycle and average power consumption analysis for the PA scheme is the same as the one for the NAN scheme. Again, integrals are calculated numerically and results of the theoretical analysis appear hereinbelow in the section entitled "Simulation Results".

The three proposed activation schemes were compared to the standard handoff algorithm of IEEE 802.11 and to a conventional fast handoff algorithm. In the standard handoff algorithm of IEEE 802.11, when a channel is actively scanned, the mobile station sends a probe request packet and monitors the channel for a time period equal to MinChannelTime. If it hears any traffic, it continues listening for a time equal to MaxChannelTime. During this interval, the mobile station collects all probe responses from any available access points, otherwise it switches to the next channel after MinChannelTime expires. Once the scanning phase is completed, the mobile station selects the best access point for its handoff target.

In the conventional fast handoff algorithm, a neighbor graph is formed dynamically for each AP and mobile stations limit their scanning to neighbors of the AP with which the mobile station is currently associated. In the conventional fast handoff algorithm, a mobile station scanning for APs sends a probe request and waits for MinChannelTime. If the mobile station senses a busy channel, it remains until the end of MaxChannelTime. However, since the mobile station knows the number of neighbor APs on each channel, the mobile station does not have to wait until the end of MaxChannelTime after receiving responses from all the neighbor APs. In the conventional fast handoff algorithm, the mobile station terminates scanning once a suitable target AP is found, and does not continue scanning in search of a better AP.

Simulation Results

Figure 8:
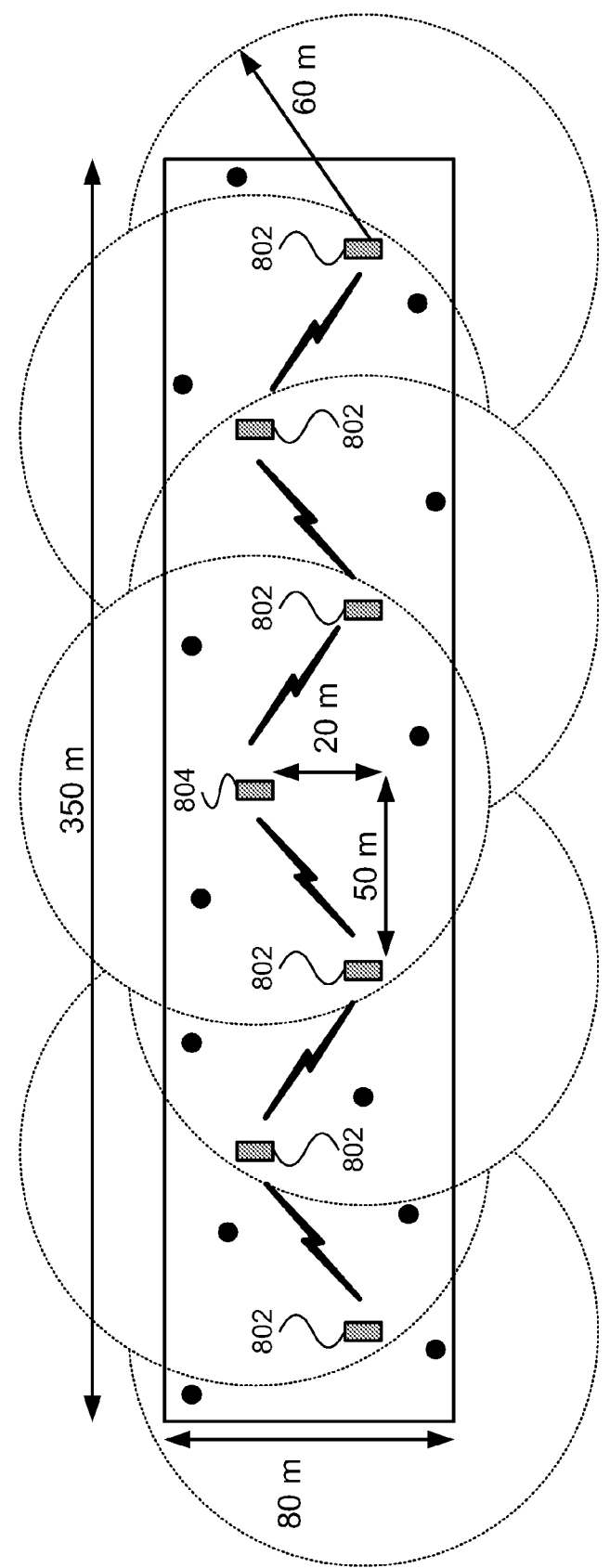
FIG. 8 is a schematic illustration of an exemplary linear topology of access points.

Simulations of various topologies of wireless access points and various usage scenarios were performed to study the handoff process. FIG. 8 is a schematic illustration of an exemplary linear topology, in which APs 802 and 804 are located on two parallel lines which represent covering a road or corridor. The central AP 804 is connected to the wired infrastructure and operates as a root AP. All data traffic is assumed to flow through the root AP.

Figure 9:
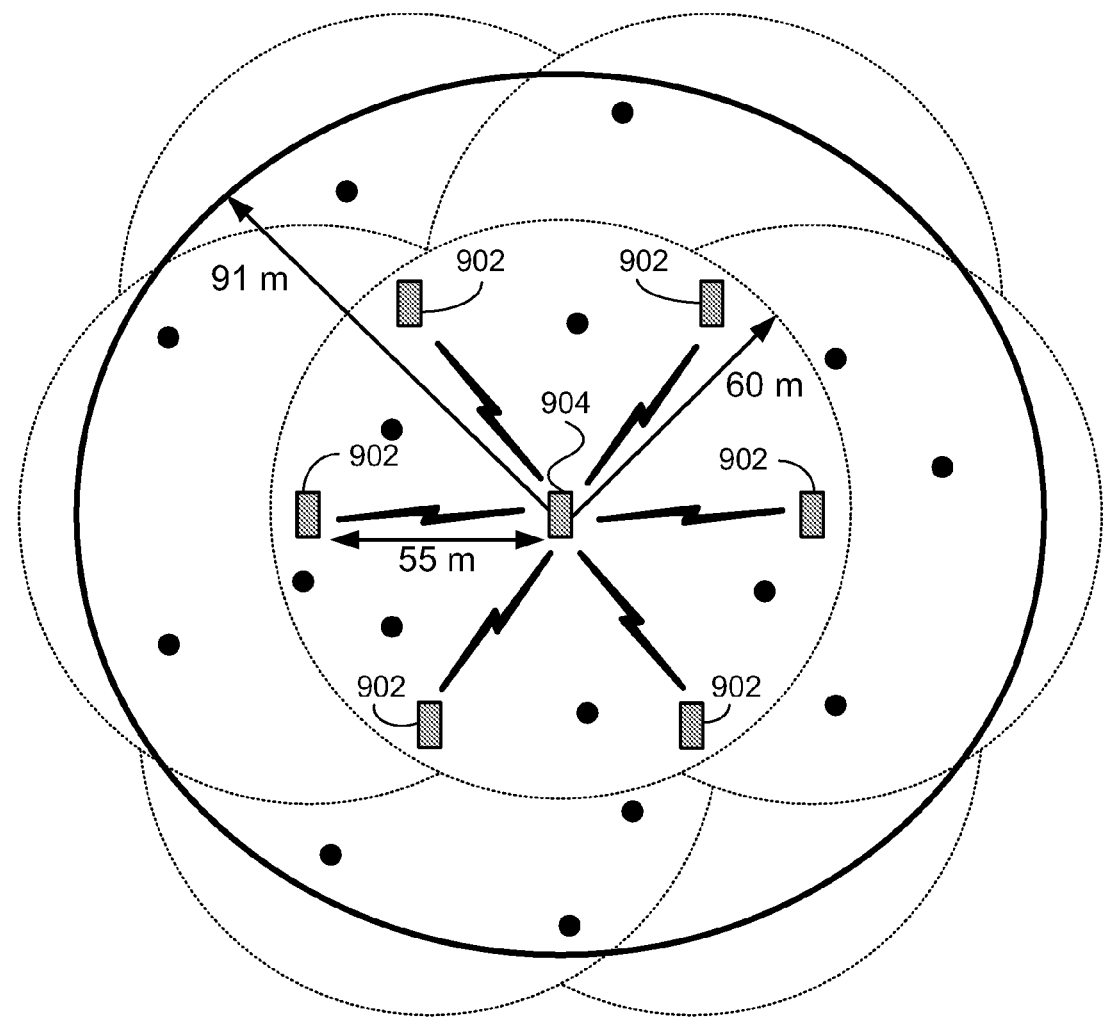
FIG. 9 is a schematic illustration of an exemplary circular topology of access points.

FIG. 9 is a schematic illustration of an exemplary circular topology, in which APs 902 surround a root AP 904 that is connected to the wired infrastructure. All data traffic is assumed to flow through the root AP.

Each topology was tested in two scenarios: dense and sparse. In the dense scenario, there were eight mobile stations associated with each AP, and in the sparse scenario, there were only two mobile stations associated with each AP. Mobile stations moved based on a standard random waypoint model with random speeds uniformly chosen between zero and $v_{MAX}=2$ m/s. Mobility regions were chosen such that the mobile stations are always fully inside the coverage area and do not need to scan at the border of network coverage where no other AP is available. The range of each AP was chosen to be 60 m, and Activation_Threshold and Scan_Threshold values corresponded to 46 m and 53 m, respectively. Other simulation parameters are listed in Table 1 below.

TABLE 1

Default Simulation Parameters

| Parameter | Value |
| --- | --- |
| AP beacon interval | 120 ms |
| Service Interval Period | 60 ms |
| MinChannelTime | 6 ms |
| MaxChannelTime | 21 ms |
| WLAN transmission rate | 54 Mbps |
| Number of mobile stations per AP | 2 or 8 |
| Data packet payload | 625 bytes |
| Power consumption in LISTEN mode | 500 mW |
| Power consumption in TRANSMIT mode | 750 mW |
| Power consumption in RECEIVE mode | 500 mW |
| Power consumption in DOZE mode | 2 mW |

Figure 10:
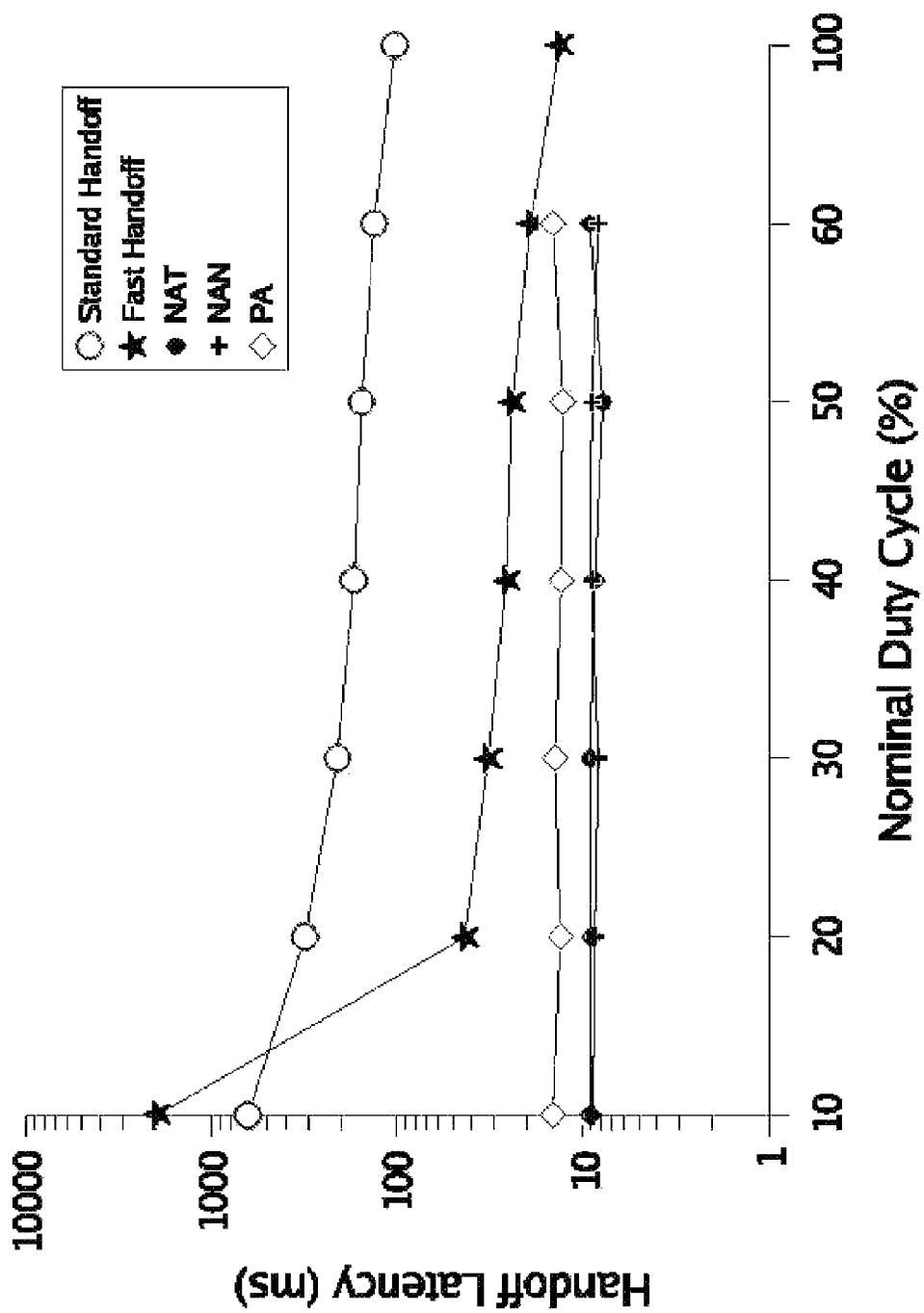
FIG. 10 is a graph of handoff latency as a function of nominal duty cycle in the exemplary linear topology of FIG. 8 with two mobile stations per access point.
Figure 11:
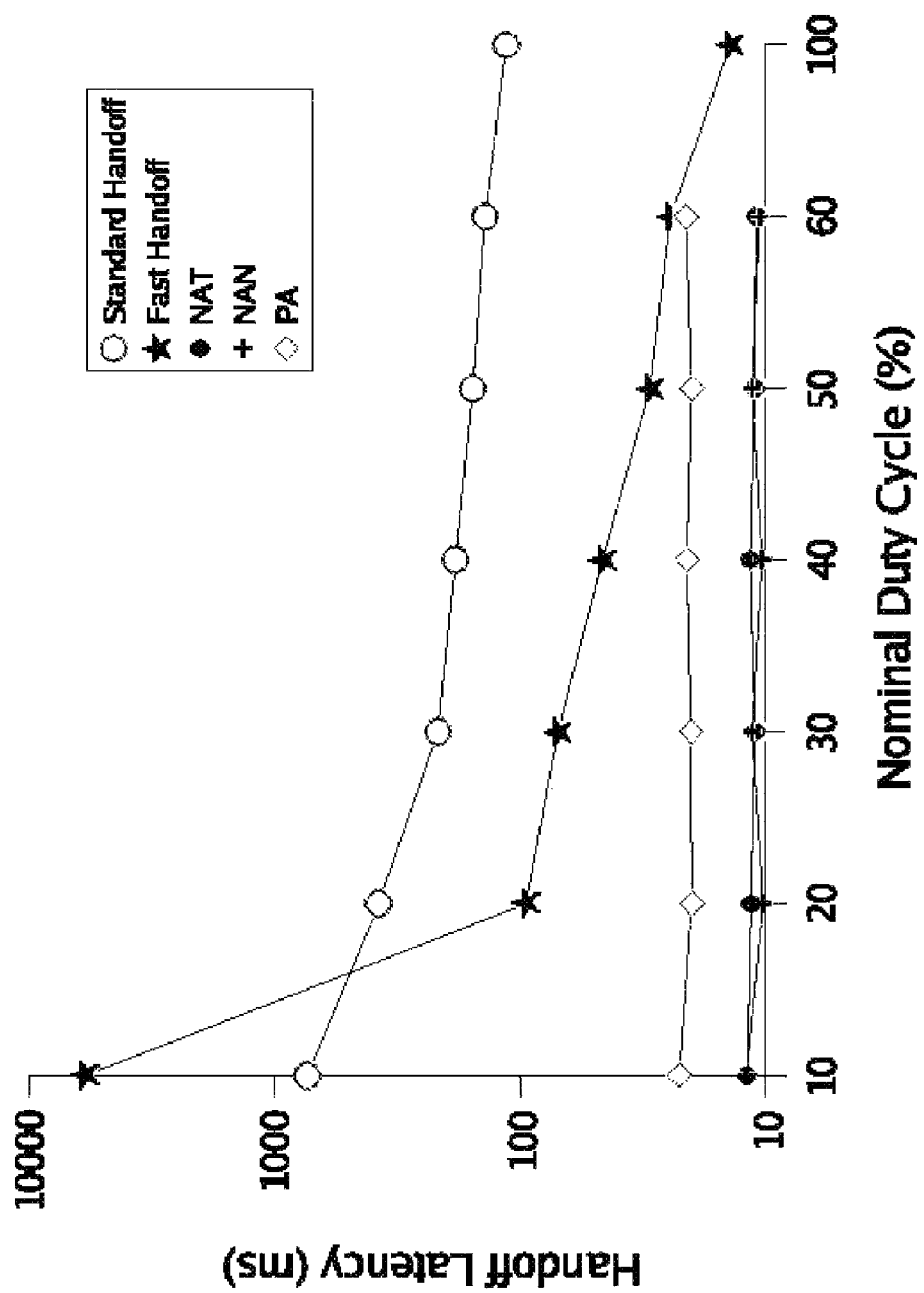
FIG. 11 is a graph of handoff latency as a function of nominal duty cycle in the exemplary circular topology of FIG. 9 with two mobile stations per access point.

FIGS. 10 and 11 show the average handoff delay in the sparse scenario for the linear and circular topologies, respectively. The conventional fast handoff method generally has shorter handoff latency than the standard handoff algorithm. However, when APs attempt aggressive power saving, the fast algorithm performs worse since it limits scanning to neighbors only and the scanning mobile station may easily miss sleeping APs. Handoff delay of both standard and fast algorithms in heavy power saving cases is much larger than that required for typical real-time applications. As the nominal duty cycle grows, APs spend less time in a low-power state and handoffs are accomplished faster. While the latency of the non-activated algorithms heavily depend on the sleep duty cycle, the latency of the proposed NAT, NAN and PA schemes remains fairly constant since target APs are activated in advance of the handoff. For duty cycles close to 100%, APs are active most of the time by default. In this case, the performance of the proposed schemes approaches that of the fast handoff algorithm.

Figure 12:
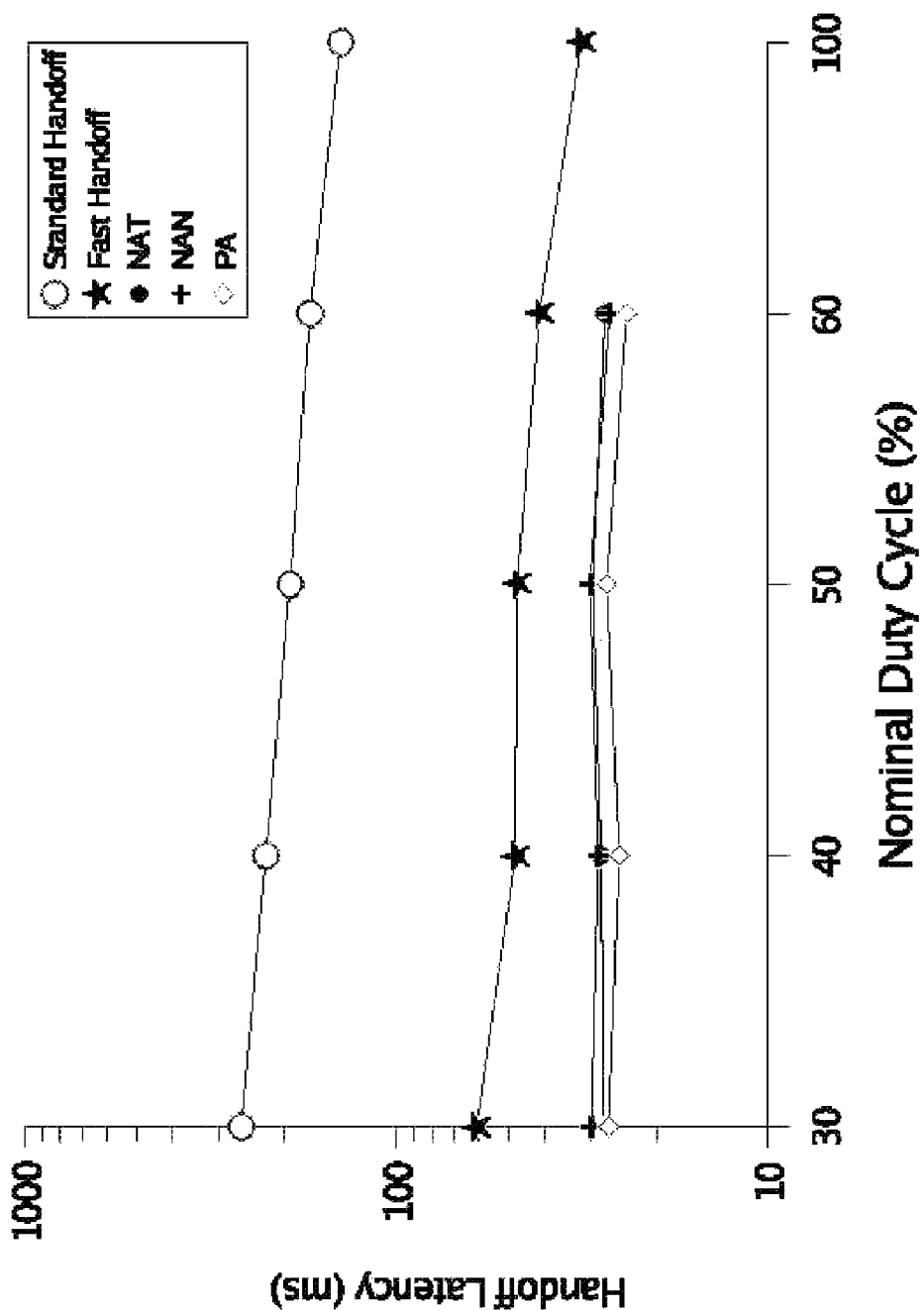
FIG. 12 is a graph of handoff latency as a function of nominal duty cycle in the exemplary linear topology of FIG. 8 with eight mobile stations per access point.
Figure 13:
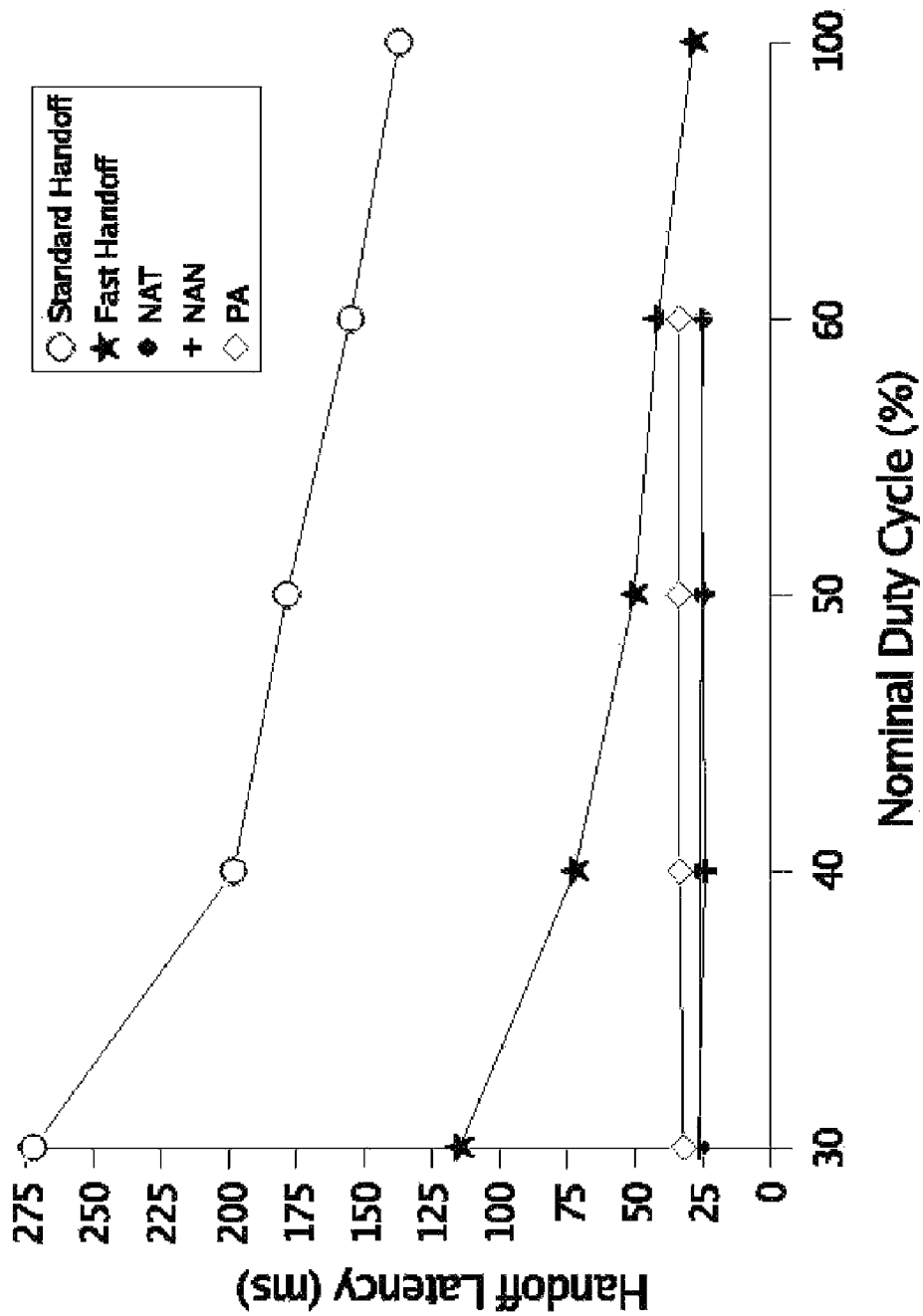
FIG. 13 is a graph of handoff latency as a function of nominal duty cycle in the exemplary circular topology of FIG. 9 with eight mobile stations per access point.

FIGS. 12 and 13 show the handoff delay for the dense scenario for the linear and circular topologies, respectively. As with the sparse scenario, the handoff latency in the conventional schemes grows as APs try to save more power, while handoff performance remains independent of duty cycle when activating schemes such as the proposed NAT, NAN and PA schemes are used. Busy networks show longer handoff delays than sparse ones with the same duty cycle. When scanning in busy networks, it is more likely for a mobile station to hear traffic from other mobile stations during MinChannelTime and to wait until MaxChannelTime.

Figure 14:
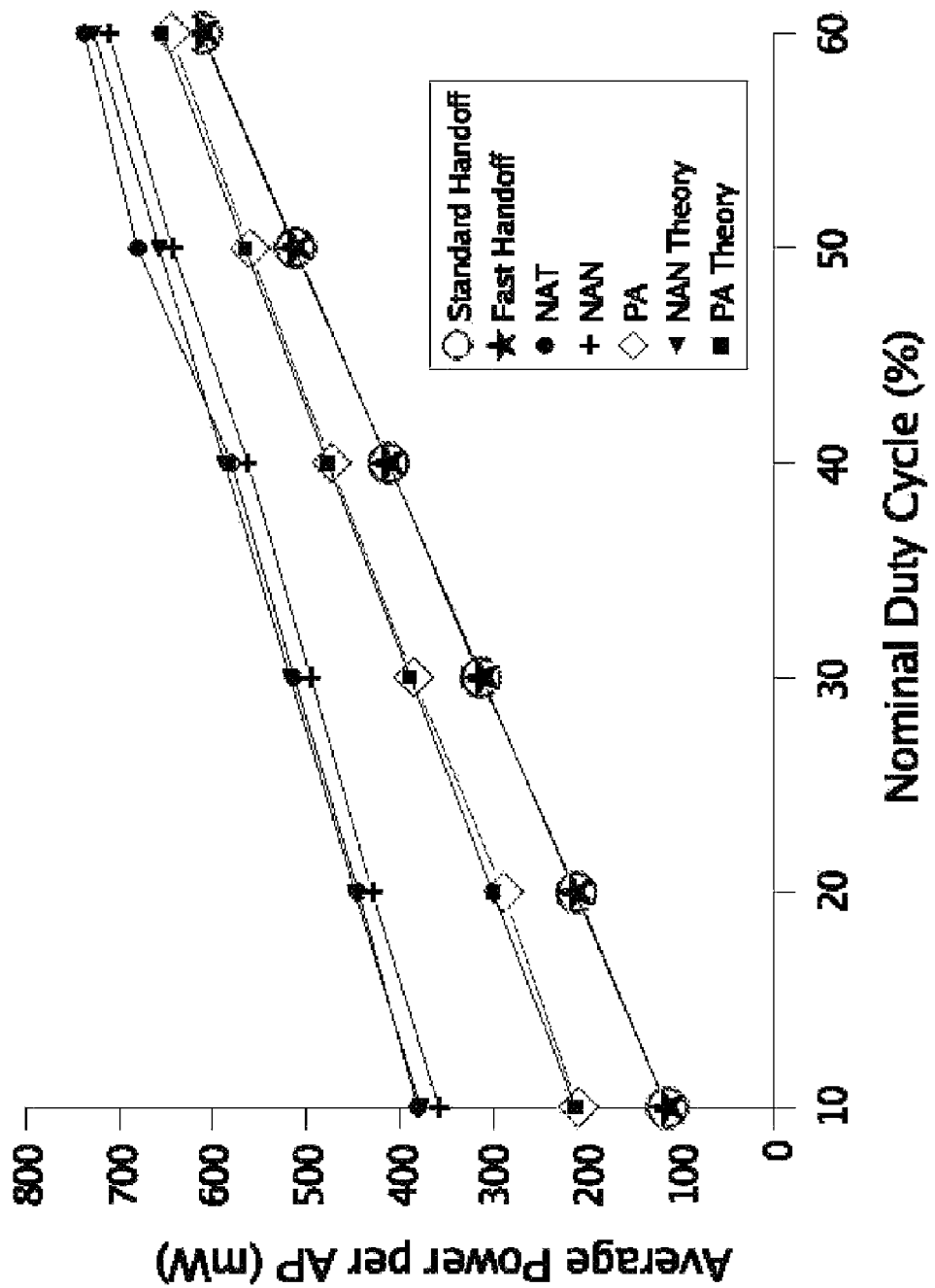
FIG. 14 is a graph of average power per access point as a function of nominal duty cycle in the exemplary linear topology of FIG. 8 with two mobile stations per access point.
Figure 15:
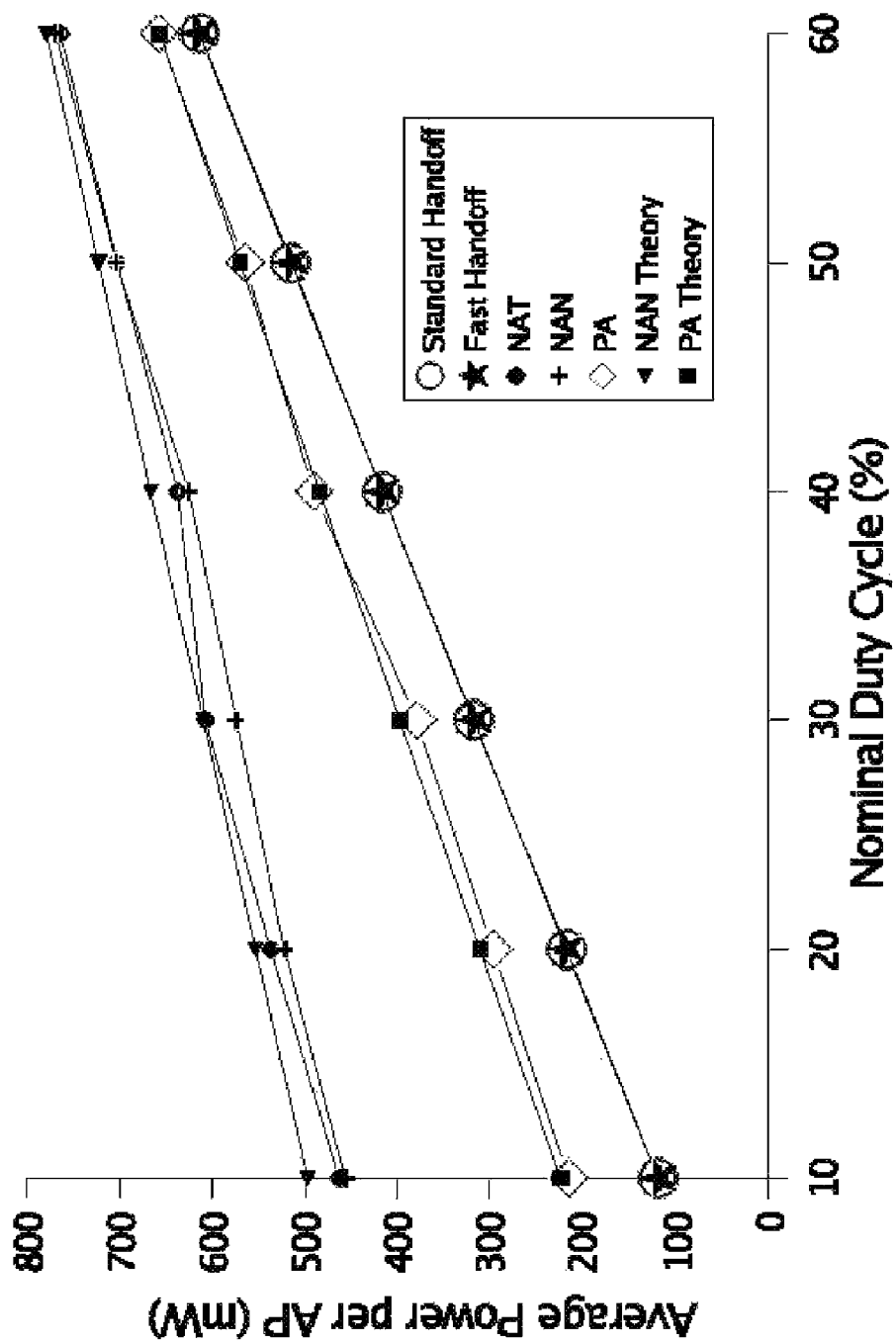
FIG. 15 is a graph of average power per access point as a function of nominal duty cycle in the exemplary circular topology of FIG. 9 with two mobile stations per access point.

FIGS. 14 and 15 show average AP power consumption in the sparse scenario for the linear and circular topologies, respectively. The power consumption of the standard and fast handoff algorithms are basically the same since neither activates neighboring APs. The NAT scheme is the simplest of the activation schemes proposed herein, and consumes more power than the NAN and PA schemes. The NAN scheme is slightly more power efficient, because it allows neighbor APs to be deactivated when handoff is completed. While the PA scheme shows slightly longer handoff latency, it is much more power efficient than the NAT and NAN schemes. Due to simplifications in the theoretical analysis, the predicted power consumption is slightly higher than the results obtained from the simulation. For example, the node distribution for the random waypoint model is not uniform, but peaked in the middle of the network. Since coverage areas of cells have more overlap in the circular topology, the power overhead of the NAT and NAN schemes for the circular topology are slightly more than that of the NAT and NAN schemes for the linear topology.

Figure 16:
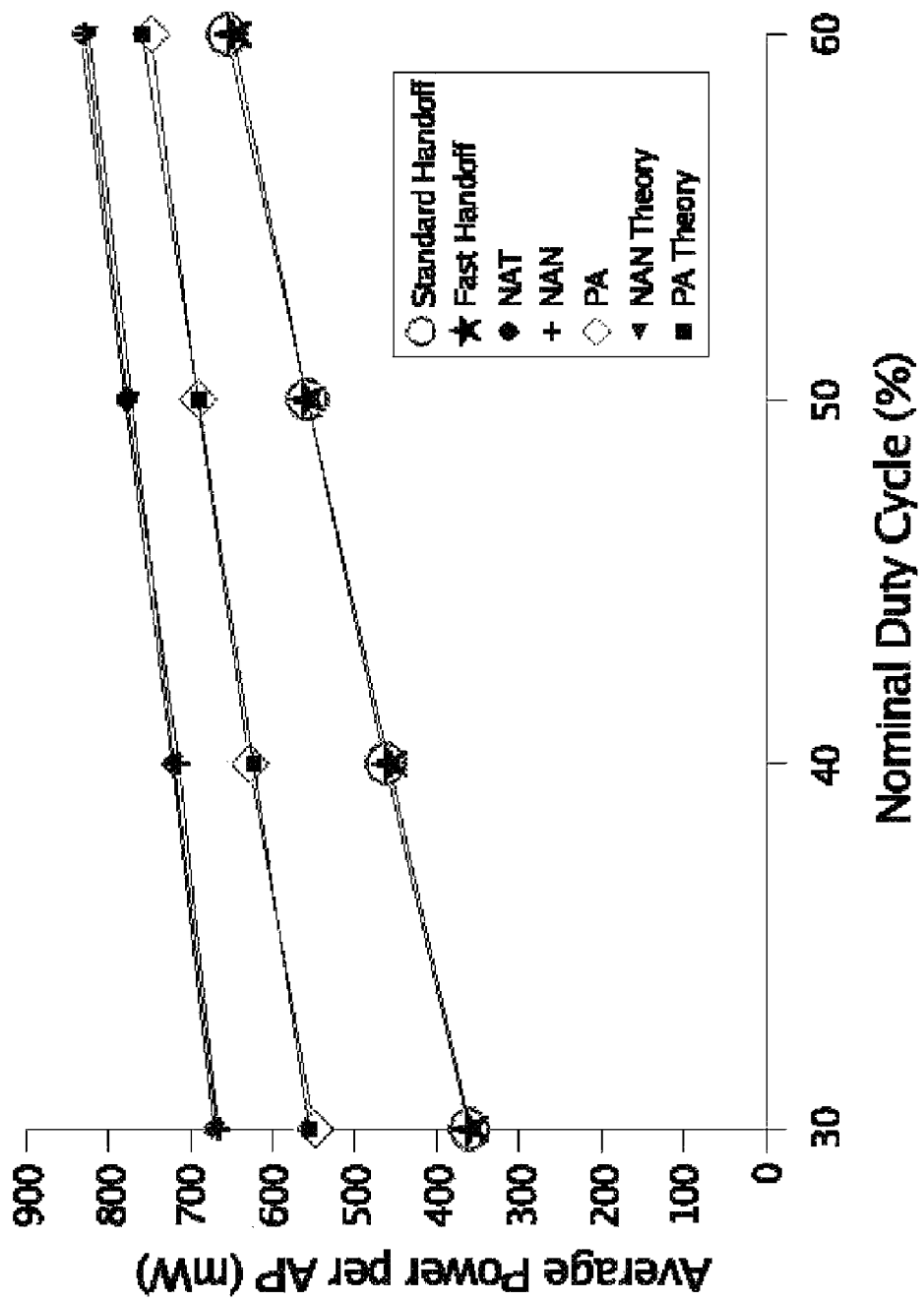
FIG. 16 is a graph of average power per access point as a function of nominal duty cycle in the exemplary linear topology of FIG. 8 with eight mobile stations per access point.
Figure 17:
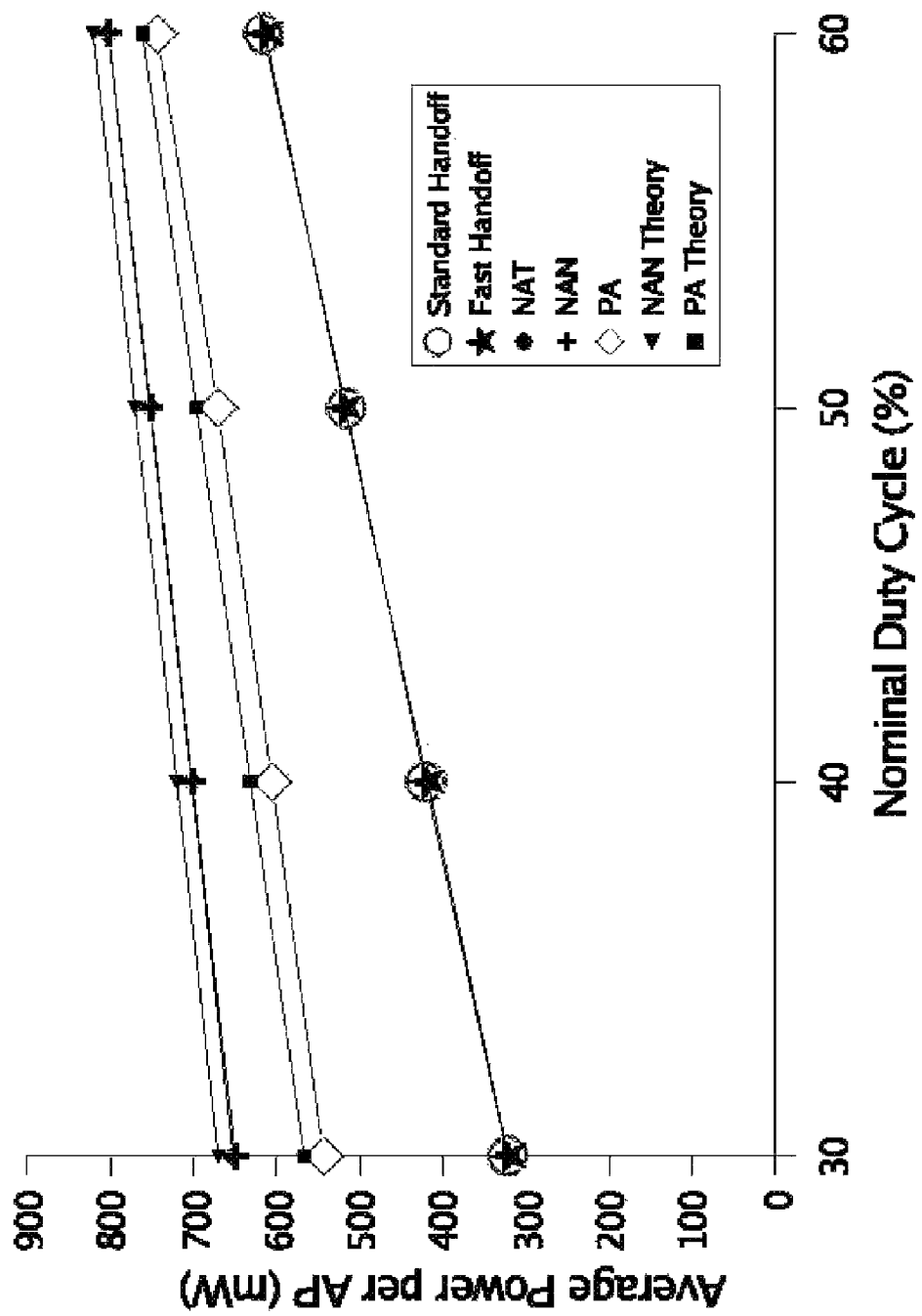
FIG. 17 is a graph of average power per access point as a function of nominal duty cycle in the exemplary circular topology of FIG. 9 with eight mobile stations per access point.

FIGS. 16 and 17 show average AP power consumption in the dense scenario for the linear and circular topologies, respectively. As in the sparse scenario, the PA scheme shows far better power efficiency while both theoretical analysis and simulation results verify that in busy networks the NAT and NAN schemes require almost 100% duty cycle. As the number of mobile stations increases, it is more likely for an AP that a mobile station is moving in an activation region of its neighbors. With too many mobile stations, the actual duty cycle of the APs reaches 100%.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reducing handoff latency in a mesh wireless local area network, the method comprising:

in anticipation of a probable handoff by a mobile station currently associated with a particular mesh access point in said network, sending an activation alert from said particular mesh access point to one or more other mesh access points in said network;

determining at said particular mesh access point that the quality of a wireless link between said mobile station and said particular mesh access point has dropped below a predetermined threshold, thus anticipating said probable handoff;

if a receiving mesh access point of said one or more other mesh access points is in a low-power state upon receipt of said activation alert, entering a higher-power state in said receiving mesh access point upon receipt of said activation alert; and if said receiving mesh access point is not in said low-power state upon receipt of said activation alert, refraining from entering said low-power state in said receiving mesh access point upon receipt of said activation alert.

2. The method of claim 1, further comprising:
maintaining said higher-power state in said receiving mesh access point for at least a predetermined period of time.

3. The method of claim 1, further comprising:
after a period of time, determining at said particular mesh access point that said quality has dropped even further below said predetermined threshold; and
sending another activation alert to said one or more other mesh access points in said network.

4. The method of claim 1, further comprising:
if said particular mesh access point has received an indication that said mobile station has selected a certain mesh access point in said network as a target for handoff, having said particular mesh access point send a deactivation alert to one or more of said one or more other mesh access points other than said certain mesh access point.

5. The method of claim 1, further comprising:
if said particular mesh access point has received an indication that said mobile station has selected a certain mesh access point in said network as a target for handoff, having said certain mesh access point send a deactivation alert to said one or more other mesh access points.

6. The method of claim 1, further comprising:
if said particular mesh access point has received an indication that a certain mesh access point in said network has a highest link quality sampled by said mobile station, sending another activation alert to said certain mesh access point.

7. The method of claim 1, further comprising:
if said particular mesh access point has received an indication that said mobile station has selected a certain mesh access point in said network as a target for handoff, sending another activation alert to said certain mesh access point.

8. The method of claim 1, wherein said activation alert is relayed from said particular mesh access point to said receiving access point via a relay path that includes at least one relaying mesh point, the method further comprising:
upon receipt of said activation alert by said relaying mesh point, entering a higher-power state in said relaying mesh point if said relaying mesh point is in a low-power state; and
upon receipt of said activation alert by said relaying mesh point, refraining from entering said low-power state in said relaying mesh point if said relaying mesh point is not in said low-power state.

9. The method of claim 1, wherein said activation alert is relayed from said particular mesh access point to said receiving access point via a relay path that includes at least one relaying mesh access point, the method further comprising:
upon receipt of said activation alert by said relaying mesh access point, entering a higher-power state in said relaying mesh access point if said relaying mesh access point is in said low-power state; and
upon receipt of said activation alert by said relaying mesh access point, refraining from entering said low-power state in said relaying mesh access point if said relaying mesh access point is not in said low-power state.

10. A first wireless mesh access point comprising:
a wireless communication interface;
a processor coupled to said wireless communication interface; and
a memory to store code which, when executed by said processor, results in said first wireless mesh access point sending an activation alert to one or more other mesh access points in a network to which said first wireless mesh access point belongs, wherein said activation alert, if received by a receiving mesh access point of said one or more other mesh access points in a low-power state upon receipt of said activation alert, results in said receiving mesh access point entering a higher-power state, and if received by said receiving mesh access point not in said low-power state upon receipt of said activation alert, results in said receiving mesh access point refraining from entering said low-power state;
wherein said code, when executed by said processor, further results in:
anticipating a probable handoff by a mobile station currently associated with said first wireless mesh access point;
sending said activation alert to said one or more other mesh access points in response to anticipating said probable handoff; and
determining that the quality of a wireless link between said mobile station and said first wireless mesh access point has dropped below a predetermined threshold, thus anticipating said probable handoff.

11. The first wireless mesh access point of claim 10, further comprising:
another communication interface, wherein said first wireless mesh access point is to send said activation alert by way of said other communication interface.

12. The first wireless mesh access point of claim 10, wherein said code, when executed by said processor, further results in:
determining that said quality has dropped even further below said predetermined threshold; and
sending another activation alert to said one or more other mesh access points.

13. The first wireless mesh access point of claim 12, wherein said code, when executed by said processor, further results in:
if said first wireless mesh access point has received an indication that said mobile station has selected a certain mesh access point in said network as a target for handoff, sending a deactivation alert to said one or more other mesh access points other than said certain mesh access point.

14. The first wireless mesh access point of claim 12, wherein said code, when executed by said processor, further results in:
if said first wireless mesh access point has received an indication that said mobile station has selected a certain mesh access point in said network as a target for handoff, sending another activation alert to said certain mesh access point.

15. The first wireless mesh access point of claim 12, wherein said code, when executed by said processor, further results in:
if said first wireless mesh access point has received an indication that a certain mesh access point in said network has a highest link quality sampled by said mobile station, sending another activation alert to said certain mesh access point.

16. A first wireless mesh access point comprising:

a communication interface through which said first wireless mesh access point is able to receive an activation alert originating from a second mesh access point;

a processor coupled to said communication interface; and a memory to store code which, when executed by said processor, if said first wireless mesh access point is in a low-power state upon receipt of said activation alert, results in said first wireless mesh access point entering a higher-power state upon receipt of said activation alert, and if said first wireless mesh access point is not in said low-power state upon receipt of said activation alert, results in said first wireless mesh access point refraining from entering said low-power state upon receipt of said activation alert;

wherein the sending of the activation alert is in response to the second wireless mesh access point determining that the quality of a wireless link between said second wireless mesh access point and a mobile station associated with said second wireless mesh access point has dropped below a predetermined threshold, thus anticipating a probable handoff by said mobile station.

17. The first wireless mesh access point of claim 16, wherein said first wireless mesh access point is to maintain said higher-power state for at least a predetermined period of time upon receipt of said activation alert.

* * * * *